United States Patent [19]
Andersson et al.

[11] 3,894,592
[45] July 15, 1975

[54] WATCH STEM INTERMEDIATE POSITION WAS ACHIEVED BY PUSHING STEM IN OR PULLING STEM OUT

[75] Inventors: John-Erik Andersson; Bengt-Åke Karlsson, both of Karlskoga, Sweden

[73] Assignee: AB Bofors, Bofors, Sweden

[22] Filed: Nov. 5, 1973

[21] Appl. No.: 412,921

[30] Foreign Application Priority Data
Nov. 14, 1972 Germany.......................... 2255737

[52] U.S. Cl.................................. 177/163; 177/211
[51] Int. Cl.......................... G01g 21/22; G01g 3/14
[58] Field of Search........... 177/163, 211; 73/141 A

[56] References Cited
UNITED STATES PATENTS

| | | | |
|---|---|---|---|
| 1,701,039 | 2/1929 | Ham | 177/163 |
| 3,448,424 | 6/1969 | Laimins | 177/163 UX |
| 3,554,025 | 1/1971 | Andersson et al. | 73/141 A |

*Primary Examiner*—George H. Miller, Jr.
*Attorney, Agent, or Firm*—Pollock, Philpitt & Vande Sande

[57] ABSTRACT

A scale for measuring the weight of articles being transported along the track of a conveyor system which is of the type in which each item to be weighed is supported on the track by means of a hook or the like and in which the hook is guided by a sliding and/or rolling means along a weight-meansuring element inserted in and axially aligned with the track at a weighing station. A load cell transducer supports the measuring element at each end thereof, and each load cell is preferably of the type comprising a first beam portion and a second beam portion, with the first beam portion being unconstrainedly bendable and rigidly attached to the second beam portion which extends unobstructedly beside the first beam portion but is shorter than the first beam portion. With respect to each load cell, a means is provided for securing one of the beam portions to the weight measuring element, and for securing the other beam portion to the track. In a preferred embodiment, means is provided for rotating the weight measuring member about its longitudinal axis, and a helical groove or the like is formed on the exterior surface of the weight measuring element so that, as it rotates, the sliding and/or rolling means can readily be transported over the length of the weightmeasuring element.

9 Claims, 6 Drawing Figures

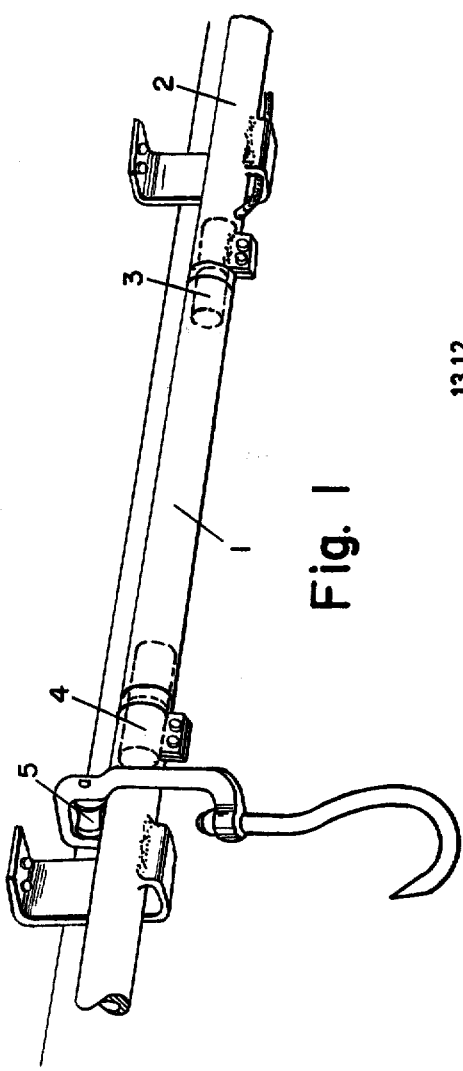
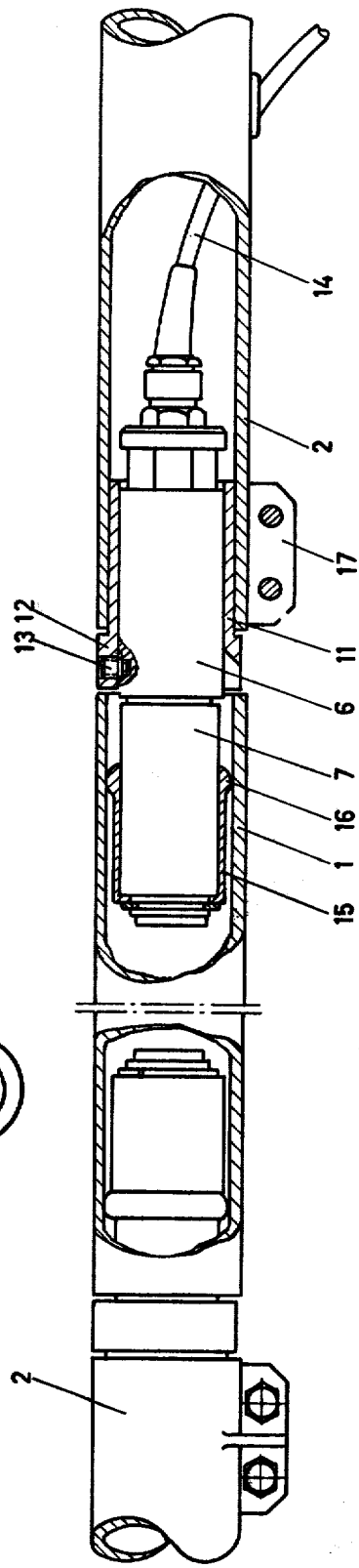

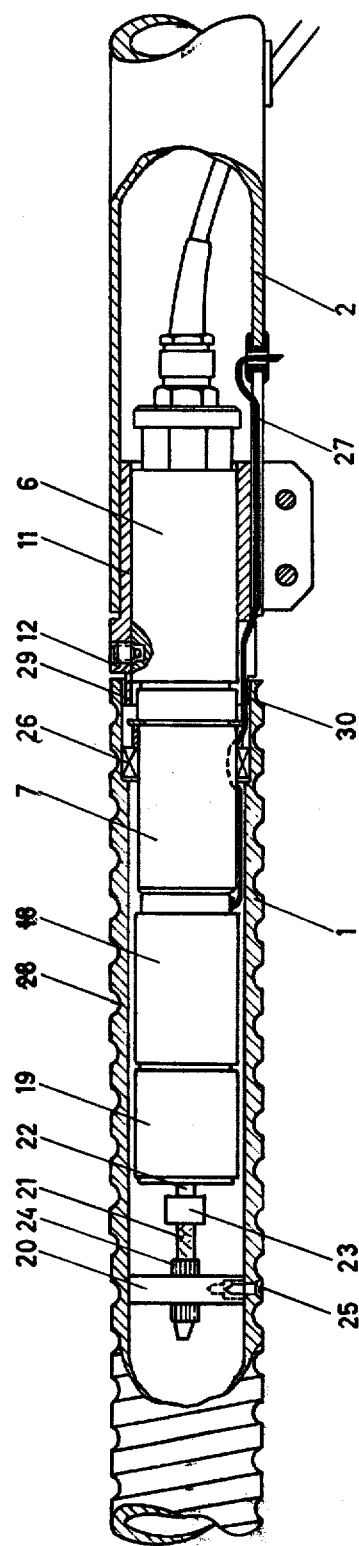

WATCH STEM INTERMEDIATE POSITION WAS ACHIEVED BY PUSHING STEM IN OR PULLING STEM OUT

Introduction

The present invention relates to a scale comprising a weight measuring member which is included in a tubular overhead track used for the transport of goods. The goods are conveyed to the member for the weighing by means of sliding and/or rolling means on the track. The scale also comprises two transducers (load cells) which uphold the weight measuring member its two ends.

BRIEF DESCRIPTION OF THE PRIOR ART

It is known in the prior art to the weight measuring member by the transducers which, however, often makes it necessary to provide complex flexural supports adjacent the member. The use of said supports results in difficulty in avoiding adverse effects on the accuracy of the scale because of force shunting effects. Also, in such prior art scales the locations of the transducers are disadvantageous from the weighing point of view. The transducers and the mechanism adjacent the scale are unprotected from the surrounding apparatus and are thus exposed to risk of mechanical damage.

SUMMARY OF THE INVENTION

The present invention solves these problems by providing an overhead track scale including a tubular track wherein the transducers are disposed inside the track and the measuring member in such a way that protruding external details, force shunting effects etc. will be wholly eliminated. A further advantage is that the measuring member can perform expansion movements caused by temperature variations without any influence on the measuring result.

According to further embodiments of the invention driving devices are provided which spin around the measuring member to guide the sliding and/or rolling means automatically from one of the ends of the measuring member to the other end. The driving devices do not interfere with the weighing procedure and may also be simple in construction.

The most outstanding characteristics of the scale according to the invention are that each is of the beam type and that each transducer is disposed inside the tubular track and the measuring member, with one of its ends attached to the track and the other end cooperating with the measuring member, or vice versa.

BRIEF DESCRIPTION OF THE DRAWINGS

A few preferred embodiments will hereinafter be described, by way of example, with reference to the accompanying drawings in which FIG. 1 is a perspective view of a tubular overhead track provided with the measuring member and with sliding and/or rolling means;

FIG. 2 is a vertical view and cross-section of a first embodiment of the transducers used in the scale of this invention;

FIG. 3 is a vertical view and cross-sectional of a second embodiment of a transducer which is connected to driving devices for spinning around the measuring member;

The corresponding details in the drawings have been given the same reference numbers.

DETAILED DESCRIPTION OF THE PREFERRED EMBODIMENTS

FIG. 1 shows in perspective view the attachment of a measuring member 1 to a tubular overhead track 2, which track is a part of a transport system for some kind of goods, for instance a system for transport of carcases in a refrigerating plant. The measuring member is supported its ends by special transducers (load cells) 3 and 4. For the transport of the goods, a rolling device 5 comprising a hook is used.

Figure 5:
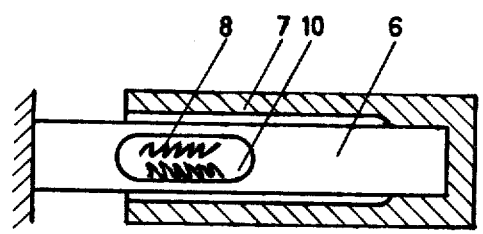
FIG. 5 is a vertical view and cross-section of a first transducer.
Figure 6:
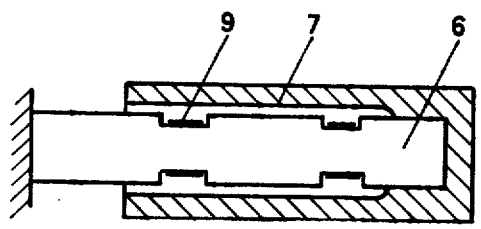
FIG. 6 is a vertical view and cross-section of a second transducer.

The fundamental construction of the transducer which can be used in the present invention is shown in FIGS. 5 and 6, which disclose that said transducers an provided with a first beam 6 which at one of its ends is unconstrainedly bendable and rigidly attached to a second beam 7, which extends unobstructedly beside the first beam and is shorter then the same first beam. In this type of transducer, the deformations in the material of the first beam caused by shearing and bending stresses, respectively, are met by means of gauges 8 and 9.

FIG. 5 illustrates the locations of the gauges 8 on the first beam in the case said deformations are sensed from said shearing stresses. In order to apply the gauges 8 in the embodiment of FIG. 5 close to the neutral axis of the first beam, it is formed in the shape of an I at least in the area of the location of the gauges 8. In this way, the gauges are applied on a part of the beam in which the deformations from the shearing stresses are large; despite this, the beam as a whole will not be weakened to any appreciable extent.

In the embodiment of FIG. 6, the first beam has been provided with corresponding cavities in order to placement of the gauges 9 at location in which deformation because of bending stresses are high. The embodiment of FIG. 6 is intended for use in the lower measuring ranges.

The transducers are shown in FIGS. 5 and 6 known in the prior art and therefore will not be descibed in detail.

In FIG. 2, the first beam of the transducer is secured inside the tubular overhead track 2, while the second beam is secured inside the measuring member 1. The first beam is attached to the tubular track via a bushing 11 which is provided with a part 12, forming an integral part of the track. An object of the bushing 11 is to adapt the external dimensions of the transducer to the internal dimension of the track. Another object of the bushing 11 is to permit adjustment of the position of the transducer in accordance with the space between the measuring member, and the track 2 (or the part 12). A third object of the bushing is to guide the transducers in the measuring direction.

The bushing is attached to the track by means of a clamping device 17 and to the transducer by means of a locking screw 13. A small space is provided between the track 2 and the member so that dynamic forces on the member, will be avoided when the sliding and/or rolling means are led over from the track to the member 1. On the contrary, the space between the part 12 on the bushing 11 and the track 2 is less important.

The attachment of the transducer to the track is performed as follows. At first, the bushing 11 is locked to the transducer with the screw 13, and after that said space is determined. Finally, the attachment by the clamping device 17 is carried out.

The transducer is provided with a conductor 14 which extends from the transducer, a portion thereof lying inside the track and out through a hole in the track.

The gauges on both of the transducers are connected in a known way to provide a constant output independent of where, on the member the load is applied.

The second beam 7 is provided with an adaptor sleeve 15 which is attached to the second beam and has a flange 16 with a curved surface, which together with a small space between the member and the flange, prevents breaking moments on the transducer by the bending of the member.

In FIG. 2, there is shown in detail the securing means for only one of the transducers. The other transducer is attached in a similar manner. However, there is a slight difference between the attachment of the transducers in that one of the transducers axially is locked both to the track and the member in a manner (not shown) to permit the member 1 to make extension movements in response to temperature variations experienced by the other transducer. High measuring accuracy is retained by the type of transducer which is used even when such extension movements appear in the measuring member.

FIG. 3 illustrates an embodiment of the invention in which the measuring member 1 is rotated about its longitudinal axis in order to automatically guide the sliding and/or the rolling means from one side of the member to the other side. In conveyor systems of the aforementioned kind, the sliding and/or rolling means with the suspended goods are hauled over the track by means of guide pins which are driven beside the track by means of some kind of machine. The use of such means may not be practical, from measuring point of view when the sliding and/or rolling means are led on to the measuring member 1. Accordingly, it may be preferable to provide means for automatically transporting the sliding and or rolling means over the length of the member 1. Accordingly, it may be preferable to provide means for automatically transporting the sliding and or rolling means over the length of the member 1.

The rotation of the member is obtained by means of driving devices which are located inside the measuring member. The driving devices comprise an electric motor 19 attached to the end surface of one of the transducers, a driving gear means 19, and a driving wheel 20, which is driven from the gear via a shaft 21. The shaft 21 is attached to the outgoing shaft 22 of the gear means via a locking device 23. The wheel 20 is journalled on a shaft 24 having splines on which the wheel is applied. The wheel 20 co-operates whith the circular inside surface of the measuring member by means of a locking screw 25. In this case the second beam co-operates with the member via a ball bearing 26, preferable a spherical ball bearing, so that the bending of the member does not prevent the spinning motion of the member or cause breaking moments on the transducer. The electric motor 18 is supplied from a source (not shown) outside the track 2 and the member 1 via the conductor 27 which extends in spaces inside the track and the member. The rotational speed of the electric motor and the gear can be chosen within wide ranges.

In order to obtain a smooth, guided and frictionless leading for the sliding and/or rolling means, the measuring length member is provided with an exterior helical groove 28. In dependence of the type of the sliding and/or rolling means, the groove 28 and the external surface of the member can be covered by material, which makes the surface and the groove glossy (e.g. Teflon). By means of the arrangement shown for the driving devices, there are forces which cause not produced shunting of the weighing of the goods being weighed, but instead the weight of the driving means is integrated into the tear weight. The attachment of the driving wheel makes the mounting and dismounting of the scale easier. Axial movements such as the bending of the measuring length member are absorbed. The driving devices are also independent of differences in manufacturing of the different components of the scale. Only one of the transducers needs to be provided with the shown driving devices.

In the embodiment of FIG. 3, there are displayed overload protective means which can be used separatly or together. In both of the cases, the overload protection consists of devices 29 and 30, respectively, which are applied on the part 12 of the bushing 11 and protrude inside the measuring length member. Said devices are adapted to the upper parts of the member and to the lower part of the transducer, respectively, with spaces. In the first case, the resilient movements of the member and the transducer are used, while in the second case only the movements in the member are used. In said first case, the bending movements can be enlarged by application of an elastic element, for instance a rubber element, adjacent the ball bearing 26.

A unit which can be applied in an expedient way into the overhead track comprises the measuring member, the transducers and joint parts which enclose those parts of the transducers which are protruding from the member. Said joint parts are then attached to the track, i.e., by means of welding. The member and the joint parts, if any, can be made from a cut part of the track.

Figure 4:
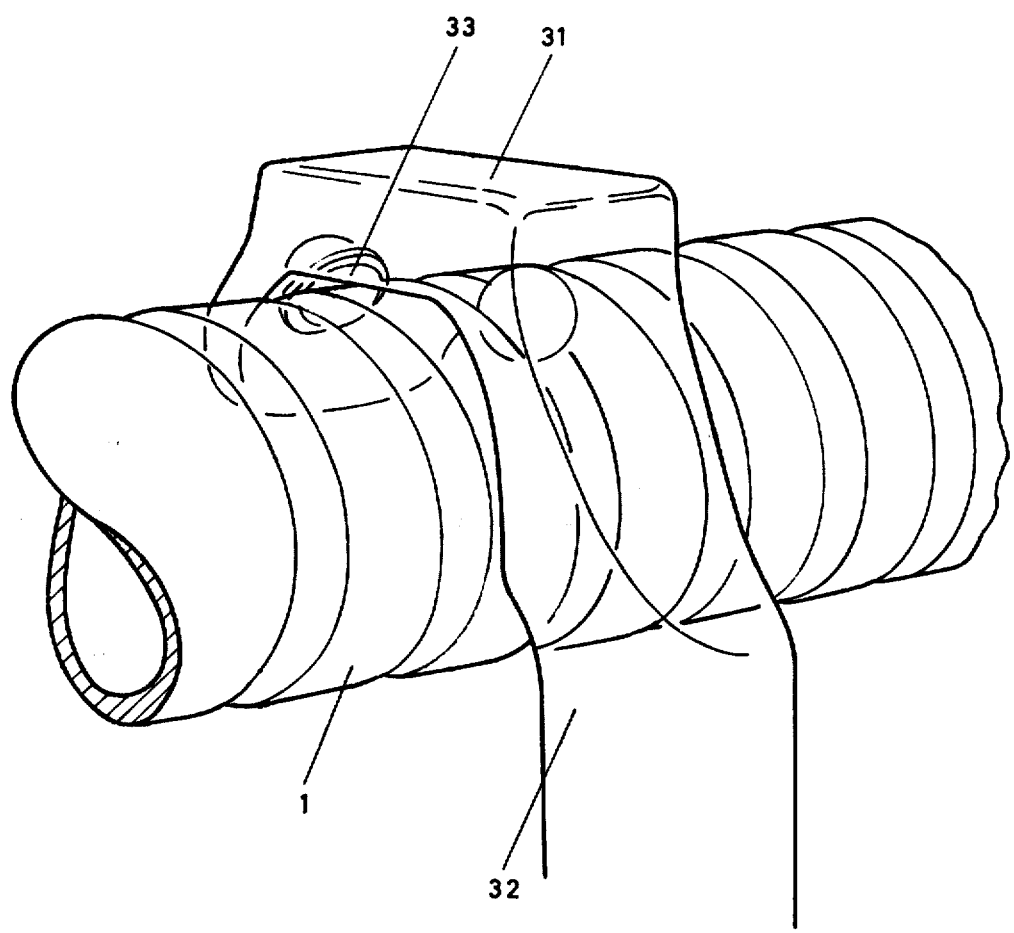
FIG. 4 is a vertical view and cross-section of the member according to FIG. 3.

FIG. 4 shows a rolling device suitable for the scale according to FIG. 3. Said rolling device has a clamp-shaped part 31 and a hook part 32. Inside the clamp-shaped part there are balls 33 which in a known way are attached so they can roll both lengthwise and in transverse directions. Thus, the rolling device will be moved easily along the track, and at the same time it can easily follow the essentially transverse groove 28 on the external side of the member, when the member is revolving. The movements of the rolling device will be even and guided on the measuring length member.

It will be understood that many changes in the details of the invention as herin described and illustrated may be made without departing from the spirit thereof or the scope of the appended claims. For example, the transducers can be turned around 180° at respective end of the member and the overload protection can be made rotation symmetric.

We claim:

1. A scale for measuring the weight of articles being transported along the track of a conveyor system which is of the type in which each item to be weighed is supported on the track by means of a hook or the like and in which the hook is guided by a sliding and/or rolling means along a weight measuring member inserted in and axially aligned with the track at a weighing station, the combination comprising:

a load cell transducer supporting said measuring member at each end thereof, means for mounting each said load cell at least in part within a respective opposing end of the track which is of hollow construction, and means for operatively connecting one end of said load cell transducer to a respective end of said weight measuring member and for operatively connecting the other end of said transducer to a respective end of the track.

2. The scale apparatus of claim 1 wherein the groove on the exterior surface of said measuring member is a helical groove.

3. The scale apparatus of claim 1 which further includes bushing means having a portion thereof secured within said track and a further portion which is secured to a part of said load cell transducer.

4. The scale apparatus as claimed in claim 1 which further includes an adaptor sleeve fitting about the portion of the load cell transducer which is supported within said weighing member, said adaptor sleeve having an outwardly extending annular flange which bears against the inner surface of said weighing member.

5. The scale apparatus of claim 1 wherein said means for securing said measuring member to the track at each end is arranged to provide a small longitudinal spacing between the measuring member and the adjoining end of the track.

6. The scale apparatus of claim 1 wherein one of said load cell transducers is axially connected both to the track and to said measuring member, whereby expansion movements caused by temperature variations acting on said weighing members is experienced by the other load cell transducer.

7. The scale according to claim 1 in which said measuring member is provided with an external groove and means is provided for rotating said measuring member selectively about its longitudinal axis to convey articles over the length of said measuring member. rotating 8. The scale as defined in claim 7 in which said rotating means for said measuring member comprises an electric motor attached to an end of one of said load cell transducers, a driving wheel, gear means interconnected between said motor and said driving wheel, said driving wheel cooperating with the internal surface of said measuring member to rotate said measuring member in response to energization of said motor.

9. The scale apparatus of claim 8 which further includes bearing means between said load cell transducer and said measuring member to thereby reduce friction as said measuring member rotates relative to the nonrotating load cell transducer.

* * * * *